Dec. 31, 1963

J. C. EVANS 3,115,696

METHOD OF MAKING MECHANICAL SLIDE

Filed April 25, 1962

United States Patent Office 3,115,696
Patented Dec. 31, 1963

3,115,696
METHOD OF MAKING MECHANICAL SLIDE
John C. Evans, Rochester, N.Y., assignor to Tropel, Inc., Fairport, N.Y., a corporation of New York
Filed Apr. 25, 1962, Ser. No. 190,098
10 Claims. (Cl. 29—149.5)

This invention relates to a mechanical slide and slider unit, and more particularly to a method of making the same.

An object of the invention is the provision of a generally improved and more satisfactory method of assembling the unit.

Another object is the provision of an improved method of achieving tightness together with smooth sliding ability, in a slide of the type wherein a slider has a dovetail engagement with a slide.

A further object is the provision of a new and improved method for constructing and assembling a low cost slide and slider unit.

These and other desirable objects may be attained in the manner disclosed as an illustrative embodiment of the invention in the following description and in the accompanying drawings forming a part hereof, in which.

The same reference numerals throughout the several views indicate the same parts.

Figure 2:
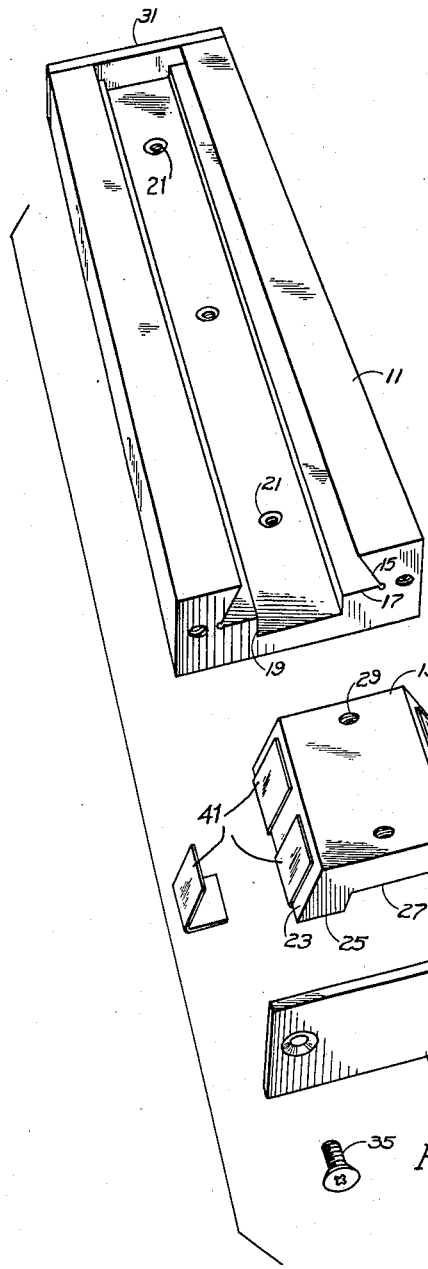
FIG. 2 is a transverse cross section of the assembled unit taken through the slider.
Figure 2:
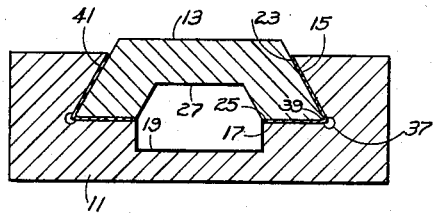
Figure 1:
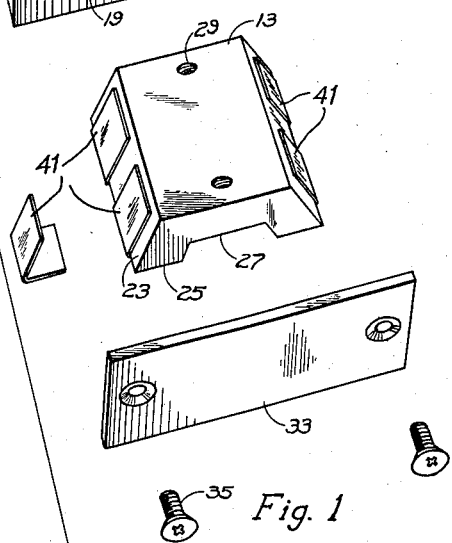
FIG. 1 is an exploded perspective view of the slide and slider unit according to the invention.

The mechanical slide according to the invention, referring to FIGS. 1 and 2, comprises an elongated generally rectangular slide 11 in which a slider 13 is received for longitudinal movement, the slide 11 and slider 13 being coupled by a suitable dovetail guide arrangement. The dovetail guide of the slide 11 is provided by a recess having oppositely slanting upwardly and inwardly inclined guide surfaces 15 at an angle of 60 degrees, for instance, the base 17 of the recess being approximately parallel to the upper and lower surfaces of the slide 11. The guide base 17 preferably has, in turn, a central recess 19 extending downwardly toward the base of the slide 11. The recess 19 preferably extends along the full length of the slide 11 and has a plurality of longitudinally spaced apertures 21 to receive fasteners, not here shown, for securing the slide unit to a base or mounting member. The recess 19 serves to lighten the weight of the slide 11, and in addition provides a space for a driving screw or rack for moving the slider 13, this cross section being readily adaptable to a screw drive or a rack and pinion drive.

The slider 13 has side guide surfaces 23 slanting oppositely inwardly and upwardly at an inclination corresponding to that of the guide surfaces 15 on the slide 11, the length of the slider 13 being considerably less than that of the slide 11. The base 25 of the slider 13 has an upwardly extending central recess 27 in alinement with the recess 19 when the slider is assembled on the slide 11. The recess 27, in similar fashion to the recess 19, serves to lighten the weight of the slider 13, and to provide a space for receiving the driving screw or rack. A plurality of longitudinally spaced apertures 29 are provided in the recess 27 to receive appropriate fasteners, not here shown, for attaching the slider 13 to any machine part or instrument part which is to be mounted thereon and moved thereby. The slider 13 is freely slidable on the slide 11 between a pair of end stop plates 31 and 33 secured to the ends of the slide 11 in a convenient manner, as by screw fasteners 35.

Figure 3:
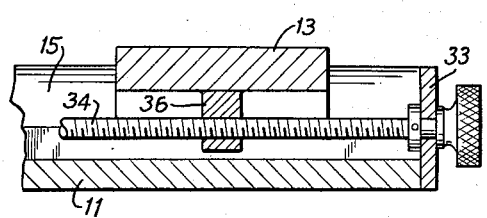
FIG. 3 is a fragmentary longitudinal section illustrating an embodiment of the present invention with a screw drive.

It can be readily seen that the driving screw of a screw drive may be journaled for rotation in one end plate, such as 33, and may extend through the recesses 19 and 27 into a tapped bore in a block secured to the slider 13 in the recess 27, so that rotation of the screw outside the end plate causes translation of the slide 13. FIG. 3 illustrates such a screw drive, the drive screw 34 being journaled in the end plate 33 and being threaded through the block 36 secured to the slider 13. In similar fashion, the rack of a rack drive may be fixed to the under side of the slider 13 in the space 27, and may be engaged by a pinion located at any convenient place, the pinion rotating, for example, in a slot formed through the recessed portion 19 of the base member 11.

The slide 11 and slider 13 are preferably made of a lightweight hard aluminum alloy to provide maximum strength for the weight involved. In order to reduce manufacturing costs, the slide 11 and slider 13 are desirably extruded, and the aluminum alloy to be used is one of the hardest alloys which can be commercially extruded. A satisfactory material is the aluminum alloy known in the trade as No. 2024, which is a Duraluminum alloy having copper as its chief alloy element to give the alloy precipitation hardening properties. The heat treatment for this readily available alloy is desirably a water quench as it is extruded and an age hardening at room temperature. Such a heat treatment is known in the trade as temper treatment No. T-4. For aluminum, this metal is hard and has good machining and wearing properties.

Since the slide 11 is to be extruded, it may be noted that the junctions between the slanting dovetail guide surfaces 15 and the base 17 are not sharp acute angles, but rather are looped outwardly as indicated at 37 to eliminate sharp corners. In similar fashion, sharp corners on the guide surfaces of the slider 13 between the slanting guide surfaces 23 and the base 25 are avoided by rounding off these corners as shown at 39. With this construction, the production of expensive sharp corners is eliminated and stress concentration is materially reduced, in addition to facilitating the machining of the dovetail guide surfaces.

In accordance with the invention there are a plurality of pads or laminations 41 of nylon material or other suitable thermoplastic material between the mating dovetail guide surfaces of the slide 11 and slider 13. The pads 41 are applied to the guide surfaces 23 and 25 of the slider 13 at either side, the slide on the guide surfaces 15 and 17 of the slide 11. In the preferred arrangement, there are two pads 41 at either side of the slider 13 spaced longitudinally from one another to provide bearing surfaces at either end. It is contemplated that the slide 11 and slider 13 may be made in a variety of lengths to suit the requirements at hand, and the pair of pads 41 on either dovetail guide surface of the slider 13 is sufficient to provide a bearing regardless as to the length of the slider 13 preferably extends above the upper surface width, over the entire length of the engageable portions of the mating dovetail guide surfaces. The upper surface of the slider 13 preferably extends above the upper surface of the slide 11, so that each pad 41 begins at the slanting dovetail guide surface 23 below the upper surface of the slider 13, at a level corresponding to the upper surface of the slide 11, and continues downwardly as a single piece to be applied around the corner 39 and over the full width of the lower dovetail guide surface 25 to the edge of the recess 27.

The V-shaped pads or laminations 41 may be made of plain nylon, or more suitably, of a molybdenum disulfide filled nylon. It is important in this application that the pads 41 have dimensional stability in order to assure a close sliding fit between the slider 13 and the slide 11. The molybdenum disulfide filled nylon is preferred because plain nylon changes dimensionally with relative humidity to a greater extent. Molybdenum disulfide is furthermore usually considered to be a lubricant, or at least an anti-frictional material in about the same sense as graphite is a dry lubricant. Thus, nylon containing molybdenum disulfide presumably is also a better bearing material than nylon from the friction point of view. A convenient molybdenum disulfide filled nylon is manufactured by the Polymer Corporation of Pennsylvania under the trade designation Nylatron G.S.

The pads 41 are bonded to the dovetail guide surfaces 23 and 25 of the slider 13 in any suitable manner, as by cementing. The cement to be used desirably is a Nitrile-rubber adhesive, a Neoprene-phenolic adhesive, or a Nitrile-phenolic adhesive. Convenient cements which have been used successfully are those of the Minnesota Mining & Manufacturing Company, bearing the trade designations EC10221, EC826, and EC776. The Goodyear Pliobond cement has also been used successfully. Although not as satisfactory as direct cementing, nylon tapes to which cement has already been applied may also be used. Furthermore, Mylar and paper tapes which are coated with adhesive on both sides may be used, although again this is not as satisfactory as direct cementing. Where a tape is used to provide a bond between the nylon pad 41 and the slider 13, it becomes, of course, an interlayer in the assembly.

The thin pads or laminations 41 providing the bearing surfaces between the slide 11 and slider 13 have the advantage of allowing a tight fit between the sliding parts while yet requiring a minimum of machining of the metallic guide surfaces. In other words, there may be broad tolerances on the mating dimensions of the slide 11 and slider 13, in the order of .003 inch. The parts are machined so that there is ordinarily, in the cold state, an interference fit between the slide 11 and the slider 13 to which the nylon pads 41 have been applied. The dovetail guide surfaces 15 and 17, and 23 and 25, are preferably smoothed by a lapping operation, which also assures parallelism of the ways. The guide surfaces are thus machined to a high degree of surface finish but have a relatively broad tolerance in absolute dimensions.

Assembly of the slider 13 on the slide 11 is accomplished in the following manner: The slide 11 is heated in an oven to expand it, to a temperature in the range of about 150 degrees to 300 degrees Fahrenheit. The slider 13 with the cemented nylon pads 41 is maintained at room temperature or below, in the range of zero degrees to 70 degrees Fahrenheit, so that although there would ordinarily be an interference fit between the parts 11 and 13, under the differential temperature condition imposed, slider 13 can be inserted into slide 11. After this assembly, the slide unit is kept at the elevated temperature of about 150 degrees to 300 degrees Fahrenheit for a sufficient period of time, usually from one to two hours although possibly less than one hour, for the adhesive cementing the nylon pads 41 primarily to yield thermoplastically under the pressure exerted when both parts 11 and 13 come to equilibrium temperature. Alternatively, the temperature may be raised to the range of about 400 degrees to 475 degrees Fahrenheit for less than twenty minutes or so, during which time the nylon yields primarily. In this higher temperature range oxygen attacks nylon readily, embrittling it so that a coating of oil is desirable over the nylon pads, and the holding time is made as short as possible, not longer than twenty minutes and preferably less. The degree of temperature and the length of time at which the assembled slide is kept at the elevated temperature determines the closeness or looseness of fit. The nylon pads 41 are kept relatively thin so that their mechanical strength properties do not have much effect upon the mechanical yield of the slide when loaded.

As has been mentioned previously, the length of the slide 11 may be varied. For example, it may be manufactured as a stock item in lengths from 6 inches to 18 inches, with different sizes varying by three inch increments. The length of the slider 13 may also be varied, either correspondingly or independently according to the requirements at hand. For the sample dimensions given, the width of the slide 11 may be 1½ inches, and the width of each of the nylon pads 41 may be one-half inch. The thickness of the nylon pads 41 for this example is only .010 inch.

As was previously mentioned, the cross section of the slide unit is designed for adaptability to a screw driven slider 13, and to a rack and pinion driven slider. Graduated scales may be placed upon the slide unit to indicate the position of the slider 13. Two or more slide units may be conveniently compounded into two and three way motion systems. In a two-way motion system, for instance, the slide 11 of the second unit is fastened to the slider 13 of the first unit, usually at right angles thereto.

The basic slide or slider assembly, or controlled motion units, may be incorporated into instruments, laboratory equipment, and light machinery, for example. The slide units are compact, lightweight, and may be produced at low cost while yet having versatility in action. They may be incorporated into instruments and equipment at a saving in production costs. The machining of the slide unit is reduced to a minimum, as the slide and slider are initially extruded aluminum stock. The dovetail guide surfaces 15 and 17 of the slide 11, and the guide surfaces 23 and 25 of the slider 13 require machining to a high degree of surface finish but only to relatively broad tolerances. A tight sliding fit of the slider 13 in the slide 11 is achieved by the aforementioned inexpensive method of assembly.

The pads 41 have been described above as being of nylon, since this is the preferred material. However, they may be made of other thermoplastic materials capable of withstanding the temperatures necessary to expand the slide so that the slider will fit therein as above described. Suitable thermoplastic materials, in addition to nylon, are acetyl resins such as the product "Delrin" available on the market from E. I. du Pont de Nemours & Co.; fluorocarbon resins such as the product "Teflon" available on the market from the same source and the product "Kel–F" available on the market from Minnesota Mining & Manufacturing Co.; polycarbonate resin such as the product "Lexan" available on the market from General Electric Co.; and the well known and widely available plastics polyethylene and polypropylene and vinyl chloride and polyvinyl chloride and polystyrene.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

This application is a continuation-in-part of application Serial No. 22,776, filed April 18, 1960, now Patent 3,054,645, granted September 18, 1962.

What is claimed is:

1. A method of manufacturing a slide unit comprising the steps of providing an extruded slide and an extruded slider each having mating dovetail guide surfaces, forming said dovetail guide surfaces to relatively loose fit, bonding a plurality of pads of thermoplastic material to the dovetail guide surfaces of said slider with adhesive to provide bearings, said slider with said applied pads having an interference fit with said slide, heating said slide while keeping said slider at room temperature, sliding said slider into the expanded slide, heating the assembled slide and slider to an equilibrium temperature and holding this equilibrium temperature while one of the elements comprising (a) adhesive and (b) pads primarily yields thermoplastically, and cooling the assembled slide and slider to room temperature.

2. A method as defined in claim 1, wherein the slide is initially heated to a temperature in the range of 150° to 300° F., and the assembled slide and slider are subsequently heated to a temperature of 150° to 300° F. for a period of about one hour.

3. A method as defined in claim 1, wherein the slide is initially heated to an elevated temperature and the assembled slide and slider are subsequently heated to a temperature in the range of 400° to 450° F. for a period of less than twenty minutes.

4. The method as defined in claim 3, in which the pads are of nylon.

5. A method of manufacturing a slide unit comprising the steps of providing an extruded aluminum slide and an extruded aluminum slider each having mating dovetail guide surfaces, forming said dovetail guide surfaces to a relatively loose fit while having a high degree of surface finish, cementing a pair of longitudinally spaced molybdenum disulfide filled thermoplastic pads to the dovetail guide surfaces of said slider at either side to provide bearings, said slider with the applied pads having an interference fit with said slide, heating said slide to a temperature of 150° to 300° F. to expand it thermally while keeping said slider at room temperature, sliding said slider into the expanded slide, heating the assembled slide and slider to an equilibrium temperature in the range of 150° to 300° F. for a period of from one to two hours so that the cement primarily yields thermoplastically, and cooling the assembled slide and slider to room temperature.

6. The method as defined in claim 5, in which the pads are of nylon.

7. A method of manufacturing a slide unit comprising the steps of providing an extruded aluminum slide and an extruded aluminum slider each having mating dovetail guide surfaces, machining said dovetail guide surfaces to a relatively loose fit while having a high degree of surface finish, cementing a pair of longitudinally spaced molybdenum disulfide filled thermoplastic pads to the dovetail guide surfaces of said slider at either side to provide bearings, said slider with the applied pads having an interference fit with said slide, heating said slide to an elevated temperature to expand it thermally while keeping said slider at room temperature, sliding said slider into the expanded slide, heating the assembled slide and slider to an equilibrium temperature in the range of 400° to 450° F. for a period of less than twenty minutes so that said pads primarily yield thermoplastically, and cooling the assembled slide and slider to room temperature.

8. The method as defined in claim 7, in which the pads are of nylon.

9. The method as defined in claim 1, in which the pads are of nylon.

10. The method of manufacturing a slide unit having a slide member provided with a longitudinal guideway and a slider member movable longitudinally along said guideway and restrained against movement relatively thereto in a lateral direction, said method comprising the steps of (a) forming said slide member and said slider member with respective cross sectional shapes and sizes having a loose fit with each other, (b) bonding to said slider member, while removed from said slide member, a pad assembly of such initial thickness and in such location that the slider member with the pad assembly thereon can not enter the guideway in the slide member while the slide member and the slider member are at the same temperature, said pad assembly including thermoplastic material, (c) causing a temperature difference between the slide member and the slider member, with the slide member at a sufficiently higher temperature than the slider member so that differential thermal expansion of the two members will change their relative sizes sufficiently so that the slider member with the pad assembly thereon may then enter the guideway in the slide member, (d) placing the slider member with the pad assembly thereon in the guideway in the slide member, and (e) bringing the slide member and the slider member to the same temperature at a sufficiently high temperature so that the thermoplastic material will yield to reduce the thickness of the pad assembly as the slide member and slider member are brought to the same temperature, thereby producing a tight play-free sliding fit of the slider member and pad assembly within the guideway of the slide member.

References Cited in the file of this patent
UNITED STATES PATENTS
2,675,276      Daugherty _____ Apr. 13, 1954